United States Patent
Song et al.

(10) Patent No.: US 9,293,945 B2
(45) Date of Patent: Mar. 22, 2016

(54) SYSTEM AND METHOD FOR CONVERTING ELECTRIC POWER, AND APPARATUS AND METHOD FOR CONTROLLING THE SYSTEM

(75) Inventors: Yujin Song, Daejeon (KR); Suyong Chae, Daejeon (KR)

(73) Assignee: KOREA INSTITUTE OF ENERGY RESEARCH (KR)

( * ) Notice: Subject to any disclaimer, the term of this patent is extended or adjusted under 35 U.S.C. 154(b) by 931 days.

(21) Appl. No.: 13/535,840

(22) Filed: Jun. 28, 2012

(65) Prior Publication Data

US 2013/0293012 A1    Nov. 7, 2013

(30) Foreign Application Priority Data

May 7, 2012    (KR) ........................ 10-2012-0048161

(51) Int. Cl.
*H02J 1/10* (2006.01)
*H02J 3/38* (2006.01)
*H02J 7/34* (2006.01)
*H02J 9/00* (2006.01)
*H02J 9/06* (2006.01)
*H02J 4/00* (2006.01)
*H02J 3/00* (2006.01)

(52) U.S. Cl.
CPC ... *H02J 9/00* (2013.01); *H02J 4/00* (2013.01); *H02J 9/06* (2013.01); *H02J 3/006* (2013.01); *Y10T 307/305* (2015.04); *Y10T 307/352* (2015.04); *Y10T 307/62* (2015.04)

(58) Field of Classification Search
CPC .......... H02J 9/00; H02J 9/06; Y10T 307/305; Y10T 307/62
USPC .......................................... 307/18, 64, 65, 80
See application file for complete search history.

(56) References Cited

U.S. PATENT DOCUMENTS

2005/0006956 A1* 1/2005 Shi .................................. 307/43
2011/0006600 A1* 1/2011 Fontana et al. .................. 307/25

* cited by examiner

*Primary Examiner* — Carlos Amaya
(74) *Attorney, Agent, or Firm* — Harness, Dickey & Pierce, P.L.C.

(57) ABSTRACT

Disclosed is technology regarding a system and a method for power conversion, particularly technology for converting power, which is supplied from a plurality of power supply sources, using a plurality of power conversion modules. A plurality of power conversion modules, which can process all of various types of supplied power, are used to convert power according to the type of supplied power. An intermediate connection unit, which can selectively connect the power supply sources and the power conversion modules, is used so that, when one of the power conversion modules has a problem, another power conversion module is used instead to guarantee stable power supply. This construction makes the power processing path flexible and enhances system stability because, even if one of the power conversion modules malfunctions, power conversion can continue through another path.

14 Claims, 13 Drawing Sheets

SYSTEM AND METHOD FOR CONVERTING ELECTRIC POWER, AND APPARATUS AND METHOD FOR CONTROLLING THE SYSTEM

CROSS-REFERENCE TO RELATED APPLICATION

This application claims priority from and the benefit under 35 U.S.C. §19(a) of Korean Patent Application No. 10-2012-0048161, filed on May 7, 2012, which is hereby incorporated by reference for all purposes as if fully set forth herein.

BACKGROUND OF THE INVENTION

1. Field of the Invention

The present invention relates to a system and a method for converting electric power, and more particularly to technology for converting electric power, which is supplied from a plurality of power supply sources, using a plurality of power conversion modules.

2. Description of the Prior Art

The type of electric power supplied from a generator is, in many cases, different from that of power that can be used by a load. For example, most nations use AC-based power grids. In contrast, most domestic appliances are DC-based. Such a difference between the type of supplied power and consumed power requires a device for converting electric power in between. One of relevant technical fields is power electronics, research on which has substantially improved power conversion technology so far.

However, most technologies concern single output regarding single supply power. This is because commonly supplied power is mostly from a commercial power grid or a specially manufactured single generator, making it unnecessary to consider a plurality of generators or a plurality of power supply sources.

However, recently increasing demands for renewable energy is followed by creation of various power supply sources. Examples of power supply sources, use of which has recently been increasing rapidly, include fuel cells, solar cells, diesel generators, vehicular generators, and lithium batteries. Such power supply sources could be used as a single power supply source; but, in most cases, their supply capacity is small, and their output fluctuates due to environmental factors. Such instability requires that they be used in parallel with other power supply sources.

SUMMARY OF THE INVENTION

Considering such a background, the present invention seeks to supply a load with various types of power generated by a plurality of power supply sources.

In order to solve the above-mentioned problems, a plurality of power conversion modules capable of processing all of various types of supplied power are used to convert electric power according to the type of supplied power, and an intermediate connection unit capable of selectively connecting the power supply sources with the power conversion modules is applied so that, when one of the power conversion modules has a problem, another power conversion module is used instead to supply power stably.

In order to accomplish this object, there is provided a power conversion system for converting power supplied from a plurality of power supply sources and supplying loads with the power, the system including a power conversion unit comprising a plurality of power conversion modules adapted to perform power conversion according to a type of power supplied from the plurality of power supply sources; an input connection unit adapted to selectively connect power supplied from each of the plurality of power supply sources to at least one of the plurality of power conversion modules; and an output unit adapted to deliver power converted by the power conversion unit to the loads.

In accordance with another aspect of the present invention, there is provided a power conversion method by a power conversion system adapted to convert power supplied from a plurality of power supply sources through a plurality of switching-type power conversion modules and supply loads with the converted power, the method including the steps of performing input connection by selectively connecting power supplied from each of the plurality of power supply sources to at least one of the plurality of power conversion modules; converting the supplied power by determining a control scheme regarding switching devices, according to power supplied from a power supply source connected in the step of performing input connection, with regard to each of the plurality of power conversion modules and performing on/off control regarding the switching devices according to the determined control scheme; and delivering the converted power to the loads.

In accordance with another aspect of the present invention, there is provided an apparatus for controlling a power conversion system adapted to convert power supplied from a plurality of power supply sources through a plurality of switching-type power conversion modules and supply loads with the converted power, the apparatus including a status monitoring unit adapted to acquire malfunction information regarding each of the plurality of power conversion modules; an input connection control unit adapted to control an input connection unit of the power conversion system installed between the plurality of power supply sources and the plurality of power conversion modules so that, when it is determined based on the malfunction information that a first power conversion module among the plurality of power conversion modules malfunctions, power supplied from a first power supply source connected to the first power conversion module is delivered to a second power conversion module; and a power conversion module control unit adapted to determine a type of power supplied from the first power supply source, when power supplied from the first power supply source is delivered to the second power conversion module through the input connection control unit, and control determination of a control scheme regarding switching devices of the second power conversion module according to the determined type.

In accordance with another aspect of the present invention, there is provided a method of controlling, by an apparatus, a power conversion system adapted to convert power supplied from a plurality of power supply sources through a plurality of switching-type power conversion modules and supply loads with the converted power, the method including the steps of acquiring malfunction information regarding each of the plurality of power conversion modules; controlling input connection by controlling an input connection unit of the power conversion system installed between the plurality of power supply sources and the plurality of power conversion modules so that, when it is determined based on the malfunction information that a first power conversion module among the plurality of power conversion modules malfunctions, power supplied from a first power supply source connected to the first power conversion module is delivered to a second power conversion module; determining a type of power supplied from the first power supply source; and performing control so that, when power supplied from the first power supply source is delivered to the second power conversion module through the step of controlling input connection, a control scheme regarding switching devices of the second power conversion module is changed according to the determined type of power supplied from the first power supply source.

As described above, the present invention is advantageous as follows: power conversion modules capable of performing power conversion according to the type of supplied power are used so that power can be converted in connection with various types of power supply sources (e.g. renewable generators); and an input connection unit is applied between the power conversion modules so that the path of processing supplied power becomes flexible. Such a flexible processing path guarantees that, even if one of the power conversion modules malfunctions, power conversion continues through another path, thereby enhancing system stability.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
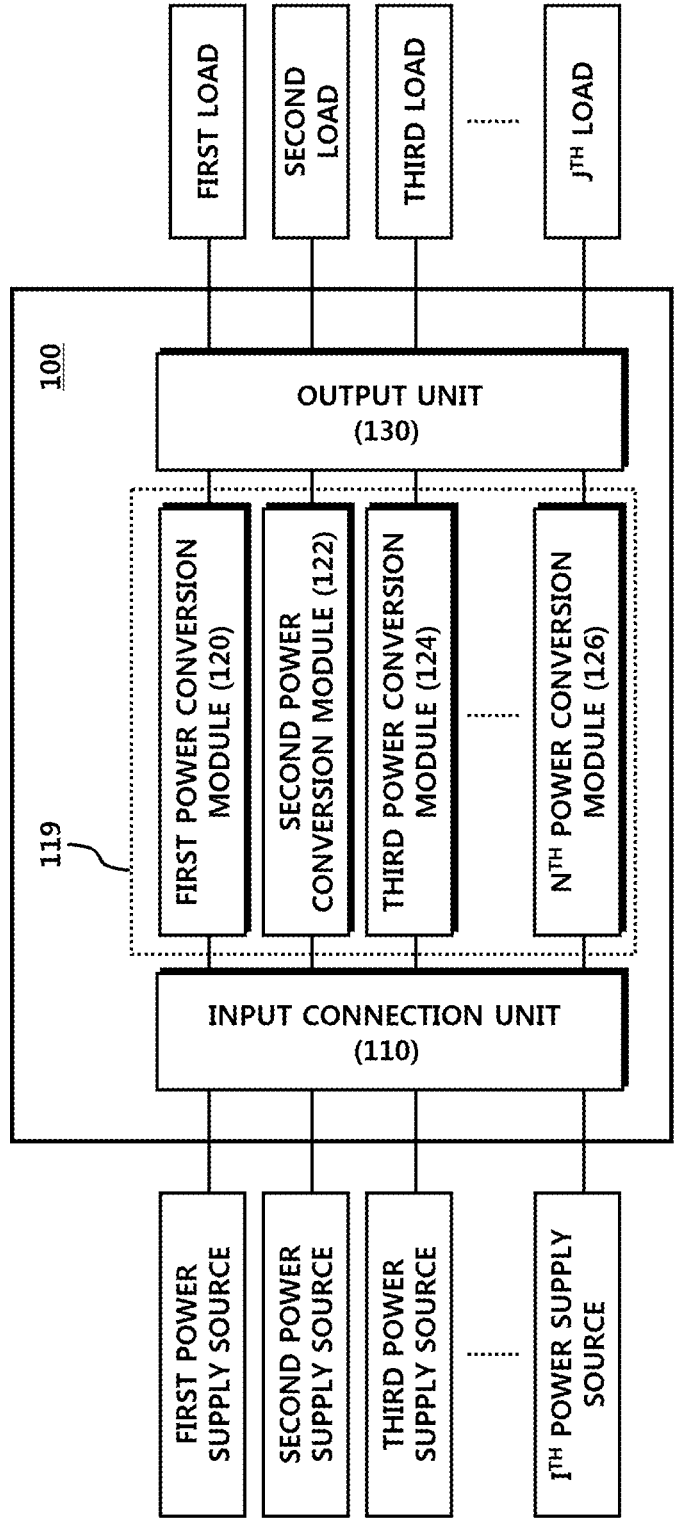
FIG. 1 is an internal block diagram of a power conversion system according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is an internal block diagram of a power conversion system 100 according to an embodiment of the present invention.

Referring to FIG. 1, the power conversion system 100 according to an embodiment of the present invention can include an input connection unit 110, a power conversion unit 119, and an output unit 130. The interconnection between the power conversion system 100 and other devices is as follows: the input connection unit 110 is connected to a plurality of generators (power supply sources) and is connected to the power conversion unit 119 (post-processing stage). The output unit 130 is connected to the power conversion unit 119 to receive converted power and is connected to a plurality of loads to deliver the received power to them. The power conversion unit 119 can include a plurality of power conversion modules, specifically a first power conversion module 120, a second power conversion module 122, a third power conversion module 124, and an $n^{th}$ power conversion module 126 (n is a natural number larger than 1).

The function of components of the power conversion system 100 will now be described: the input connection unit 110 is adapted to selectively connect power, which is supplied from each of a plurality of power supply sources, to at least one of the power conversion modules. The power conversion modules of the power conversion unit 119 are adapted to perform power conversion according to the type of power supplied from the plurality of power supply sources. The output unit 130 is adapted to deliver power, which has been converted by the power conversion unit 119, to the loads.

An embodiment regarding respective components of the power conversion system 100 for performing the above-mentioned functions and advantages resulting from such an embodiment will now be described in detail. However, such a description is only intended to make implementation of the present invention easier, interpretation of which is not to be limited to the embodiment described below.

The power conversion modules of the power conversion unit 119 will be described with reference to FIG. 2, which is an exemplary block diagram regarding function blocks of the power conversion modules.

Figure 2:
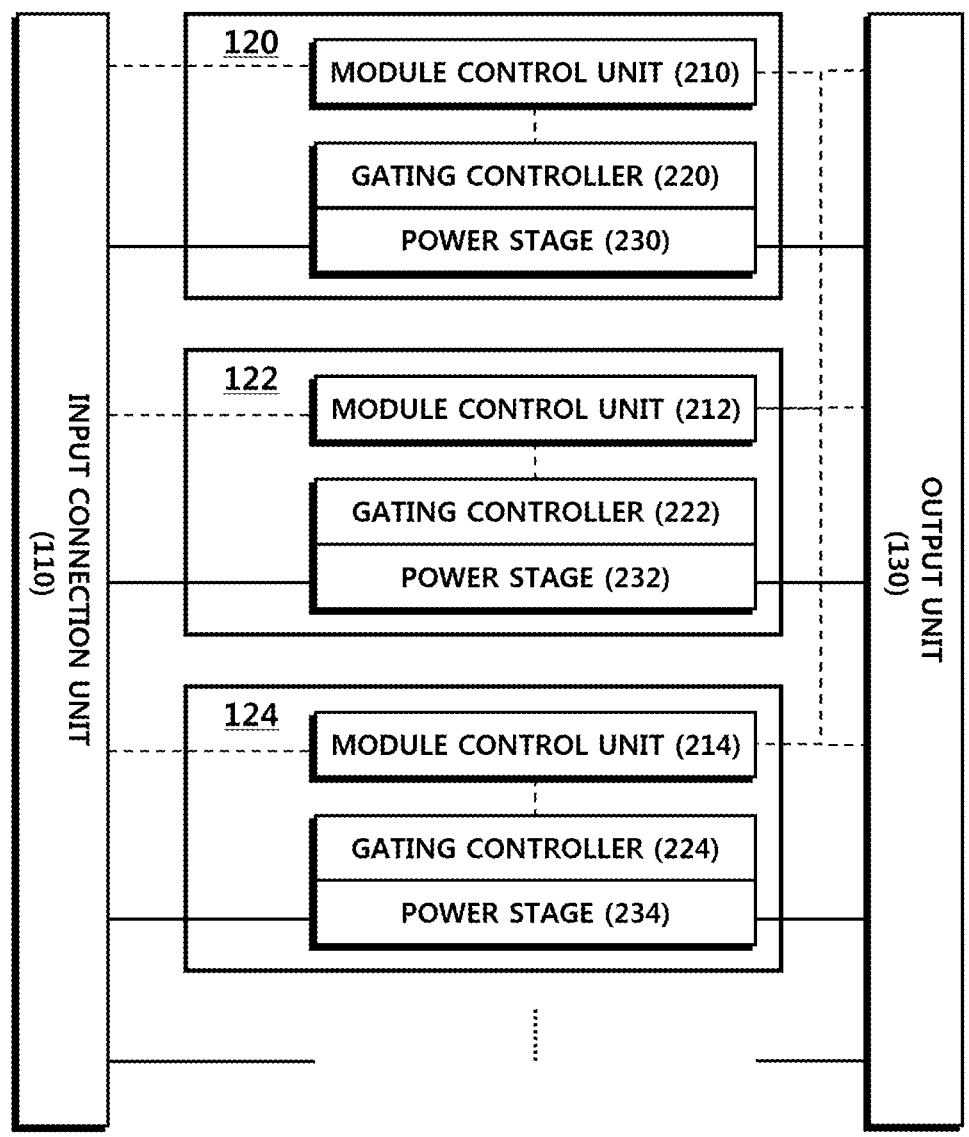
FIG. 2 is an exemplary block diagram illustrating function blocks of power conversion modules.

Referring to FIG. 2, each of the power conversion modules has a module control unit, a gating controller, and a power stage. The function blocks of each power conversion module can perform functions common to each other. Inner blocks constituting each power conversion module, in order to perform functions common to each other, can be devices made with the same design parameters, or can have standardized construction or functions so that, although they may not have the same design parameters, they can perform functions common to each other. As such, function blocks of each power conversion module can perform functions common to each other, so that each power conversion module can also perform functions common to each other, and, as a result of this, functions performed by each other can also be exchanged between each other. For example, when the first power conversion module 120 is performing a DC-DC power conversion function and when the second power conversion module 122 is performing an AC-DC power conversion function, the functions can be exchanged, i.e. the first power conversion module 120 can perform the AC-DC power conversion function, and the second power conversion module 122 can perform the DC-DC power conversion function.

In order to describe inner blocks of each power conversion module, inner blocks of the first power conversion module 120 will be described. Referring to FIG. 2, the first power conversion module 120 includes a module control unit 210, a gating controller 220, and a power stage 230. The power stage 230 is a power electronics circuit unit including a plurality of switching devices. Power conversion methods are divided into a method of making the voltage or current of inputted power constant and supplying loads with it using characteristics of devices (e.g. transistors, diodes), as in the case of a linear regulator, and another method, in contrast with the former, which uses a power electronics circuit to chop the flow of inputted power and change its flow, thereby obtaining a constant voltage or current and supplying the loads with it. The power stage 230, which is presented as an exemplary component of the power conversion module, is a power electronics circuit unit that employs the latter method to control switching devices to be turned on/off and thus process the flowing power, thereby obtaining power needed by the loads. Specifically, the power stage 230 refers to a power processing stage composed of switching devices and passive devices, such as inductors, resistors, and capacitors.

The gating controller 220, which is another component of the first power conversion module 120, is adapted to perform on/off control regarding a plurality of switching devices constituting the power stage 230. Switching devices used for a power electronics circuit can be turned on/off when a specific signal is inputted, and typical examples of switching devices include a FET (Field Effect Transistor) and an IGBT (Insulated Gate Bipolar Transistor). A type of these devices constitute the plurality of switching devices of the power stage 230, which are turned on/off in response to a specific signal generated by the gating controller 220 and transmitted to the switching devices. Besides transmitting an on/off signal to the switching devices, the gating controller 220 can also receive a control signal from other devices, which corresponds to the on/off signal. For example, the gating controller 220 controls the switching devices by creating an on/off signal according to an on/off command regarding the switching devices, which is included in a communication signal transmitted from a control unit connected via a network. It can be understood that, in this case, the gating controller 220 substantially performs a signal converting function, i.e. connects a control unit, which is connected via a network, with the power stage 230 as a hardware device. The first power conversion module 120 includes a module control unit 210 as its control unit. The gating controller 220 is positioned between the module control unit 210 and the power stage 230 to create an on/off signal, based on a control signal received from the module control unit 210, and turn on/off the switching devices of the power stage 230. The system is made flexible when the gating controller 220 and the module control unit 210 are connected via a communication network, but the type of connection is not limited to this, and any connection is possible as long as control information can be transmitted from the module control unit 210 to the gating controller 220 through an electric communication signal.

The module control unit 210, which is another component of the first power conversion module 120, is adapted to determine a control scheme regarding a plurality of switching devices of the power stage 230 according to the type of supplied power and, based on the determined control scheme, transmit an on/off command signal to the gating controller 220, thereby controlling the power stage.

The module control unit 210 can, as an example of determining the control scheme regarding the switching devices according to the type of supplied power, variously modify a switching sequence regarding the switching devices. As used herein, the switching sequence refers to a series of processes of turning on or off specific switching devices as time passes. In the case of a device that converts power using a power electronics circuit, the result of power conversion varies according to what switching sequence is used to control the switching devices.

A process of performing power conversion, by the first power conversion module 120, based on different control of a switching sequence according to the type of supplied power will be described with reference to FIG. 3, which is an exemplary circuit diagram regarding the power stage 230 of the first power conversion module 120.

Figure 3:
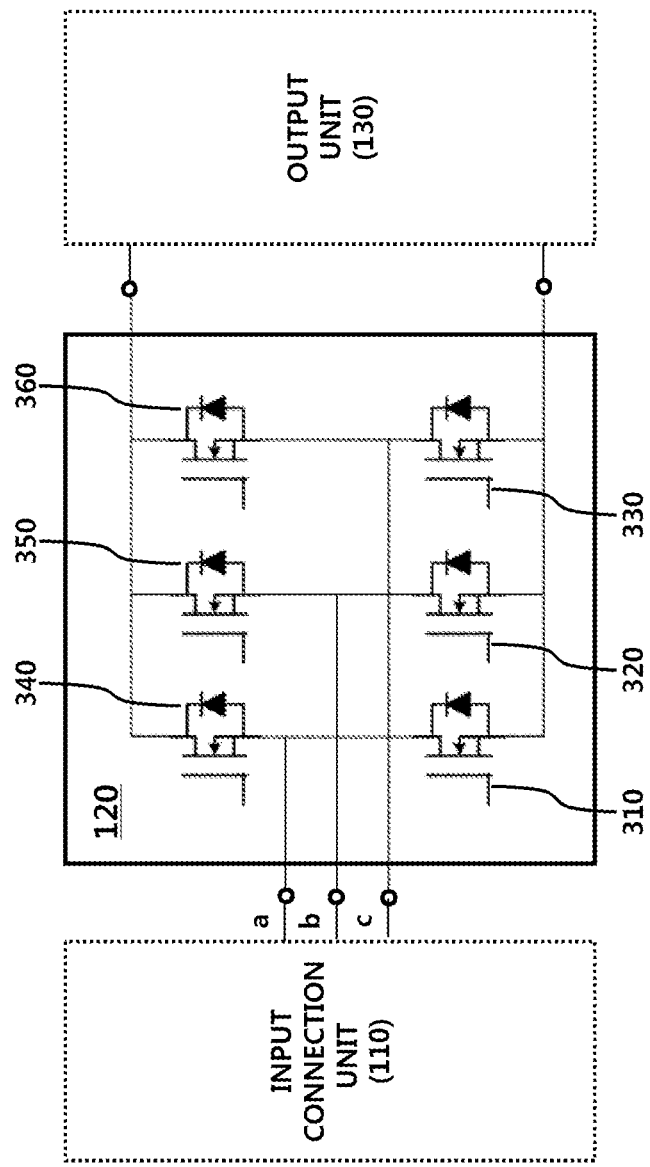
FIG. 3 is an exemplary circuit diagram regarding a power stage of a first power conversion module.

Referring to FIG. 3, the power stage 230 includes six switching devices. Such arrangement and connection of six switching devices are typical of a three-phase inverter circuit construction. Basically, by controlling the six switching devices of the power stage 230, any function selected from three-phase AC-AC power conversion and three-phase AC-DC power conversion (including AC rectification) can be performed. In the case of such three-phase inverter driving, the module control unit 210 determines a switching sequence regarding the six switching devices 310, 320, 330, 340, 350, 360 according to each control type (AC-AC power conversion, AC-DC power conversion, etc.) and, based on the determined switching sequence, transmits an on/off command to the gating controller 220 periodically or non-periodically, thereby controlling the first power conversion module. When the type of power received from the output unit 130 is determined as DC (for example, when a DC bus is positioned inside the output unit 130 as an energy buffer), the module control unit 210 grasps the type of supplied power and, when the supplied power is three-phase AC, controls the first power conversion module 120 in a control scheme corresponding to the three-phase AC-DC power conversion.

Another example of determining a control scheme regarding switching devices, by the module control unit 210, according to the type of supplied power is as follows: the module control unit 210 determines, among the plurality of switching devices of the power stage 230, switching devices that are always turned on or off; determines the topology of the circuit included in the power stage 230 accordingly; and transmits an on/off command signal to the gating controller 220 according to the determined circuit topology, thereby controlling the power stage 230.

Referring to FIG. 3 again, when the rightmost two switching devices 330 and 360 among the switching devices are always turned off, and when power is supplied only through input terminals a and b, a single-phase full-bridge circuit is constructed. By using such a single-phase full-bridge circuit and determining a different switching sequence for switching devices that are not always turned off, the module control unit 210 can perform control of single-phase DC-DC power conversion, single-phase DC-AC power conversion, single-phase AC-AC power conversion, single-phase AC-DC power conversion, etc. The module control unit 210 determines whether the type of supplied power is single-phase or three-phase and, in the case of single-phase, always turns off the two rightmost switching devices 330 and 360, as described above, to construct a full-bridge circuit and control the power stage; and, in the case of three-phase, the module control unit 210 utilizes all of the six switching devices, with no switching device turned off all the time, and control the power stage. Such determination understandably means that the module control unit 210 determines different circuit topology of the power stage according to supplied power.

The module control unit 210 can also combine determination of circuit topology with determination of a different switching sequence to determine a control scheme regarding the switching devices according to the type of supplied power: when supplied power is single-phase DC, a full-bridge circuit is constructed, as mentioned above, and the switching sequence is determined again with regard to the circuit, according to the corresponding control scheme of DC-DC power conversion or DC-AC power conversion, thereby controlling the power stage 230. Those skilled in the art can understand that the module control unit 210 can be aware of the type of power to be converted and delivered to the output unit 130 in advance and thus can determine the control scheme of one of DC-DC power conversion and DC-AC power conversion.

The above description of the first power conversion module 120 is also applicable to the second power conversion module 122, the third power conversion module 124, and the $n^{th}$ power conversion module 126.

A construction and an embodiment of the power conversion unit 119 have been described above. Advantages resulting from the construction will now be described.

It will be assumed that the first power supply source shown in FIG. 1 is a diesel generator, the second power supply source is a solar cell generator, and the third power supply source is a vehicular generator used in a large truck. Such a combination of power supply sources can be used by military forces, which need to use a lot of power in the field, as well as in isolated mountainous areas, islands, suburbs, etc. It will be assumed in the following that such a combination of power sources is used by military forces.

As an additional explanation regarding the present invention, it can be understood that military forces need to use a movable power conversion system to extract a necessary type of power from such power sources in the field. The power conversion system according to an embodiment of the present invention can be packaged in a specific structure (e.g. container box), to make it movable, and mounted on a large truck, e.g., and used. Such a packaged, movable power conversion system can be used to supply power not only to military forces, but also to areas in temporary need of power (e.g. mountainous areas, construction sites).

Advantages related to the power conversion unit 119 will be described: types of power produced by the above-mentioned first, second, and third power supply sources can be three-phase AC, single-phase DC, and single-phase DC, respectively. Power conversion modules could be manufactured and used according to respective characteristics of the different types of supplied power; however, generators are used as power sources in variable situations, as described in connection with use by military forces, and thus are likely to be varied. For example, solar cell generators cannot be used in areas with little or no sunlight, so that the second power supply source can be replaced with a fuel cell generator, a battery, or a different diesel generator. When a wind power generator is installed in an adjacent area, the wind power generator, which produces AC power, may have to be used as the third power supply source. Therefore, the above-mentioned construction of the power conversion unit 119 according to an embodiment of the present invention enables the power conversion modules to determine a different control scheme regarding switching devices according to the type of supplied power and thus convert various types of supplied power, making the power conversion system 100 according to the present invention advantageous in that power can be supplied from various combinations of power supply sources.

In addition, such multi-functional characteristics of the power conversion modules, when combined with characteristics of the input connection unit 110, enables a self-healing function of the power conversion system 100 or increases the redundancy of the power conversion system 100. This will now be described in more detail.

When the first power conversion module 120 among the plurality of power conversion modules malfunctions, the input connection unit 110 can change the connection of the first power supply source from the first power conversion module 120 to the second power conversion module 122 among the plurality of power conversion modules, which is connected to none of the plurality of power supply sources. It will be assumed, for example, that the first power supply source is connected to the first power conversion module 120, the second power supply source is connected to the second power conversion module 122, and the third power supply source is connected to the third power conversion module 124. If the first power conversion module 120 malfunctions, and if the second power supply source has stopped working and disconnected from the second power conversion module 122, the input connection unit 110 can change the connection of the first power supply source to the second power conversion module 122, as described above. This guarantees no interruption of power supply (there could be a short interruption in the process of changing connection, but this can be overcome by using an energy buffer, such as a battery or a capacitor, at the output stage) and thus continuous supply of necessary power to the loads. This embodiment is made possible because the second power conversion module 122 can perform conversion of power not only from the second power supply source, but also from the first power supply source. It can be understood by those skilled in the art that, even if the connection between the second power supply source and the second power conversion module 122 is maintained, they can be disconnected in the above-mentioned process of changing connection, if the amount of power generated by the first power supply source is superior to that by the second power supply source, and the second power conversion module 122 can be connected to the first power supply source. This process includes a process of changing the control scheme of the second power conversion module from a control scheme based on power supply from the second power supply source to a control scheme based on power supply from the first power supply source.

Another case of malfunction is as follows: when the first power supply source supplies power through both the first and second power conversion modules 120 and 122, and when the first power conversion module 120 malfunctions, the first power supply source then can use only the second power conversion module 122 to convert the supplied power. As such, the input connection unit 110 can connect a power supply source to a number of power conversion modules against a malfunction, thereby increasing redundancy of the power conversion system 100.

An embodiment of self-healing by the power conversion system 100 will now be described further: each power conversion module can use its own sensor or malfunction detection function to determine whether it is malfunctioning or not.

Alternatively, each power conversion module can monitor the status of a different power conversion module to detect its malfunction. For example, when respective power conversion modules are connected via a network, no response to a communication ACK signal for a predetermined period of time can indicate that the corresponding power conversion module is malfunctioning. Through this process, it is possible to detect a malfunction of a specific power conversion module. When a malfunction is detected, the power conversion module, which has detected it, communicates with the input connection unit 110 and changes the power supply path connected to the corresponding power conversion module, thereby solving the malfunction problem temporarily. This process can be understood as a self-healing process of the power conversion system 100.

Figure 4:
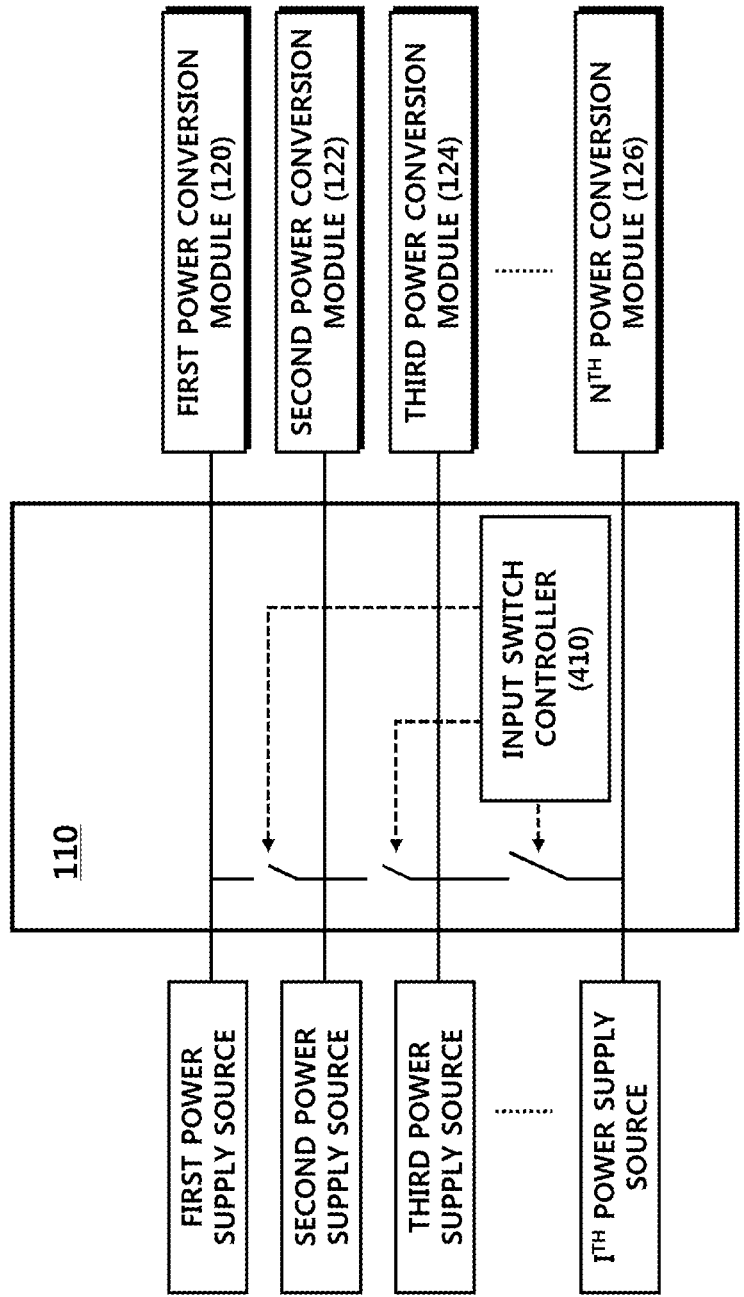
FIG. 4 illustrates an exemplary construction of an input connection unit.

The self-healing will be described further with reference to FIG. 4, which illustrates an exemplary construction of the input connection unit. Referring to FIG. 4, the input connection unit 110 uses controllable switching devices to selectively connect power, which is supplied from each of the plurality of power supply sources, to at least one of the plurality of power conversion modules. An input switch controller 410, which is adapted to control the above-mentioned controllable switching devices, can communicate with the power conversion modules; determine whether each power conversion module is malfunctioning or not through the communication; and change the path of connection from a malfunctioning power conversion module to a different one, in order to solve the malfunction problem temporarily, as described above.

The process of self-healing occurring in the power conversion system 100 will be described further with reference to FIG. 5, which is an exemplary connection diagram illustrating a process of changing the path of supplied power when the third power conversion module is malfunctioning.

Figure 5:
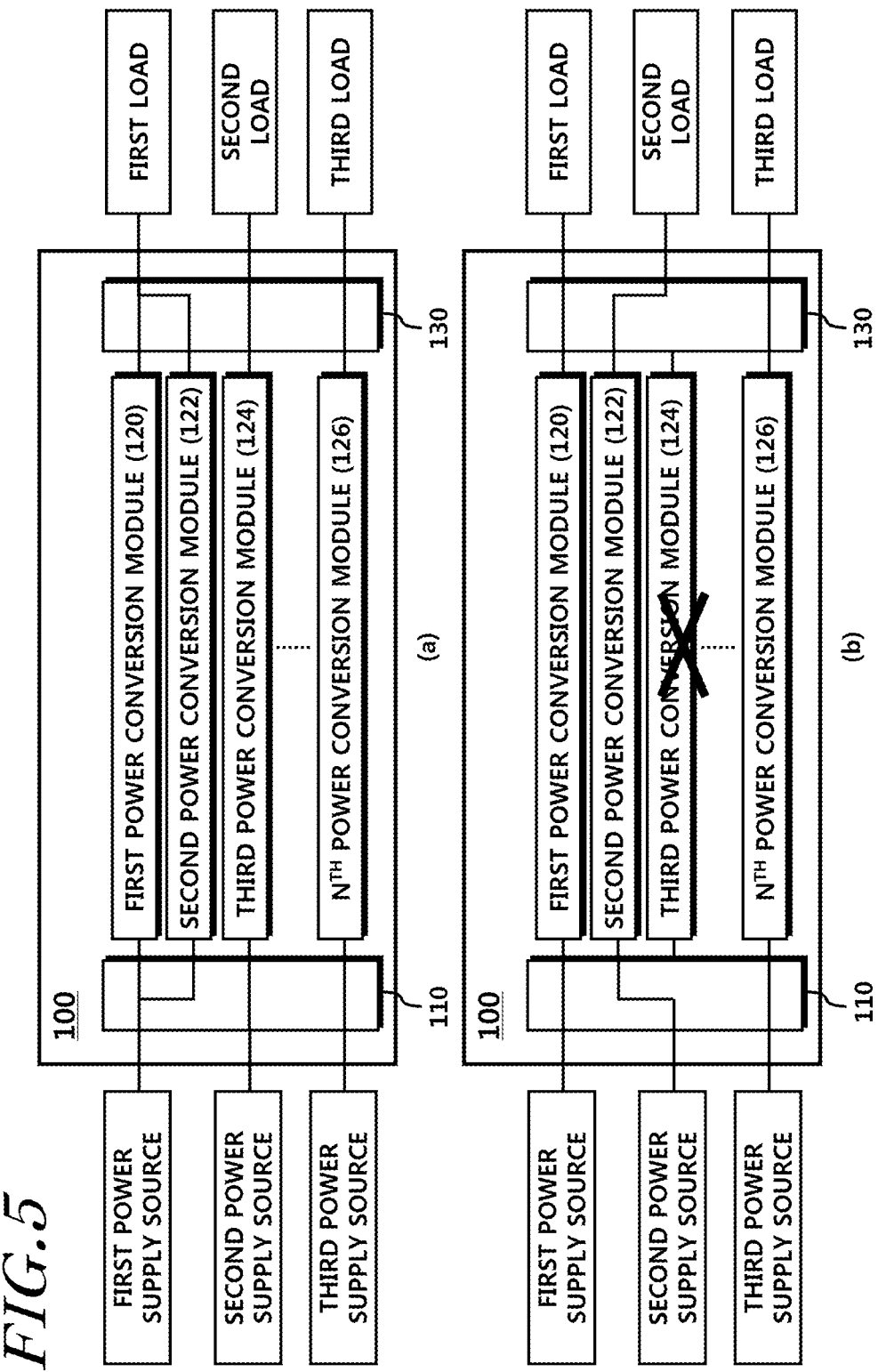
FIG. 5 is an exemplary connection diagram illustrating a process of changing a path of supplied power when a third power conversion module malfunctions.

Referring to FIG. 5 (*a*), the first power supply source is connected to the first and second power conversion modules 120 and 122. This is for the purpose of system stability: in order to have stable supply of power from the first power supply source, which is an important power source generating a large amount of power, two power conversion modules are simultaneously connected to the first power supply source. The second power supply source is connected to the third power conversion module 124, and the third power supply source is connected to the $n^{th}$ power conversion module 126. When the third power conversion module malfunctions, the third power conversion module 124 detects it and requests the input connection unit 110 to change the path to the second power conversion module 122. The connection after the path change is shown in FIG. 5 (*b*). Referring to FIG. 5 (*b*), connection of the second power conversion module 122, which has been additionally connected for stable use of the first power supply source, has been changed from the first power supply source to the second power supply source. In this process, the control scheme of the second power conversion module 122 is varied according to the type of supplied power.

Implementation of a function such as self-healing in the power conversion system 100 can be controlled by a central control apparatus (e.g. apparatus 1100 according to another embodiment of the present invention described later), which is in charge of respective blocks (input connection unit 110, power conversion unit 119, output unit 130, etc.) constituting the power conversion system 100; alternatively, each power conversion module can control the entire system like a central control apparatus. This is also referred to as a mobile agent: one of the power conversion modules plays the role of controlling the entire power conversion system 100, and the other power conversion modules follow the control. Alternatively, all of the power conversion modules can operate in a distributed computing manner, in which they function like a single controller. When the power conversion modules operate like mobile agents and control the power conversion system 100, the system stability improves because, even if one of the power conversion modules malfunctions, another power conversion module can control the power conversion system 100 instead. This avoids the problem occurring when a single central control apparatus is used to control the power conversion system 100, which stops functioning when the control apparatus malfunctions.

An exemplary construction of the output unit 130 according to an embodiment of the present invention will now be described further.

The output unit 130 can simply be cabling. In other words, when each of the plurality of power conversion modules is connected to only one load, the output unit can simply be cable connection or connection terminals. As another construction of the output unit 130, it is configured in the same manner as the input connection unit 110 to selectively supply loads with power converted by the plurality of power conversion modules. Such a construction of the output unit 130 as enabling selective connection, not the above-mentioned simple cabling, is needed to remove a malfunctioning module and supply power thorough another power conversion module as a detour.

As another construction of the output unit 130, an energy bus can be used to supply loads with power converted by the plurality of power conversion modules. As used herein, a bus refers to a kind of shared path, and a battery or supercapacitor can be used as an energy bus to construct a DC bus. The output unit, when a single AC voltage is maintained, acts as an AC bus, even if no DC bus is constructed; and the result is as if loads are supplied with power from a single AC power source. When the output unit 130 is configured as an energy bus, there is no need to add a component like the input connection unit 110, and a malfunctioning power conversion module is avoided by changing the path at the input connection unit 110.

Another construction of the output unit 130 will be described with reference to FIG. 6, which is an exemplary block diagram regarding function blocks of the output unit.

Figure 6:
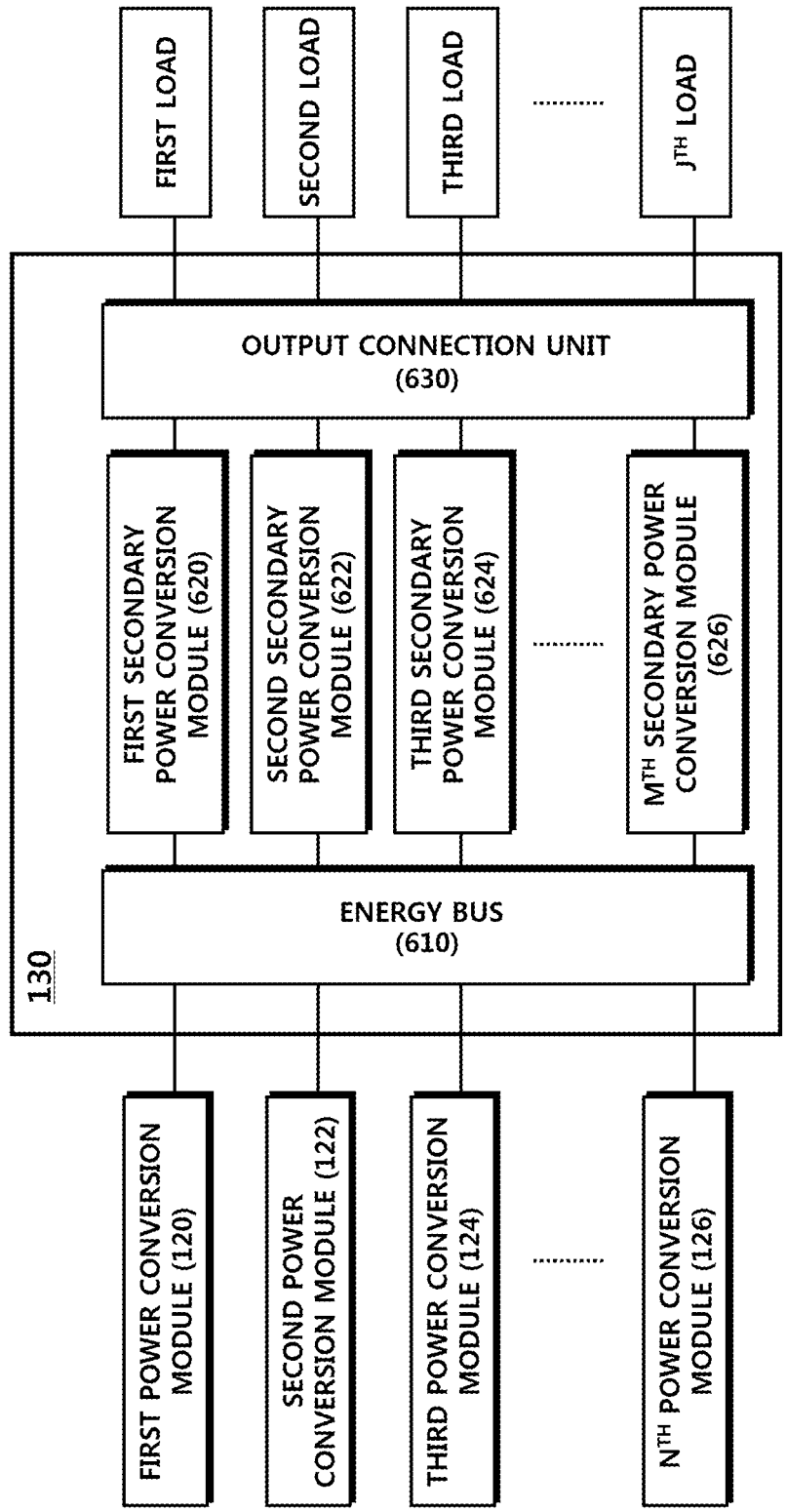
FIG. 6 is an exemplary block diagram regarding function blocks of an output unit.

Referring to FIG. 6, the output unit 130 can include an energy bus 610, a plurality of secondary power conversion modules 620, 622, 624, 626, and an output connection unit 630. The energy bus 610 includes both a DC bus and an AC bus, but the DC bus is properly used according to an embodiment of the present invention. The AC bus is applicable to a wide power grid, such a commercial power grid. In the case of a small-capacity power conversion system, the DC bus is properly used, which employs a battery, a supercapacitor, etc., and which can function as an energy buffer.

Figure 7:
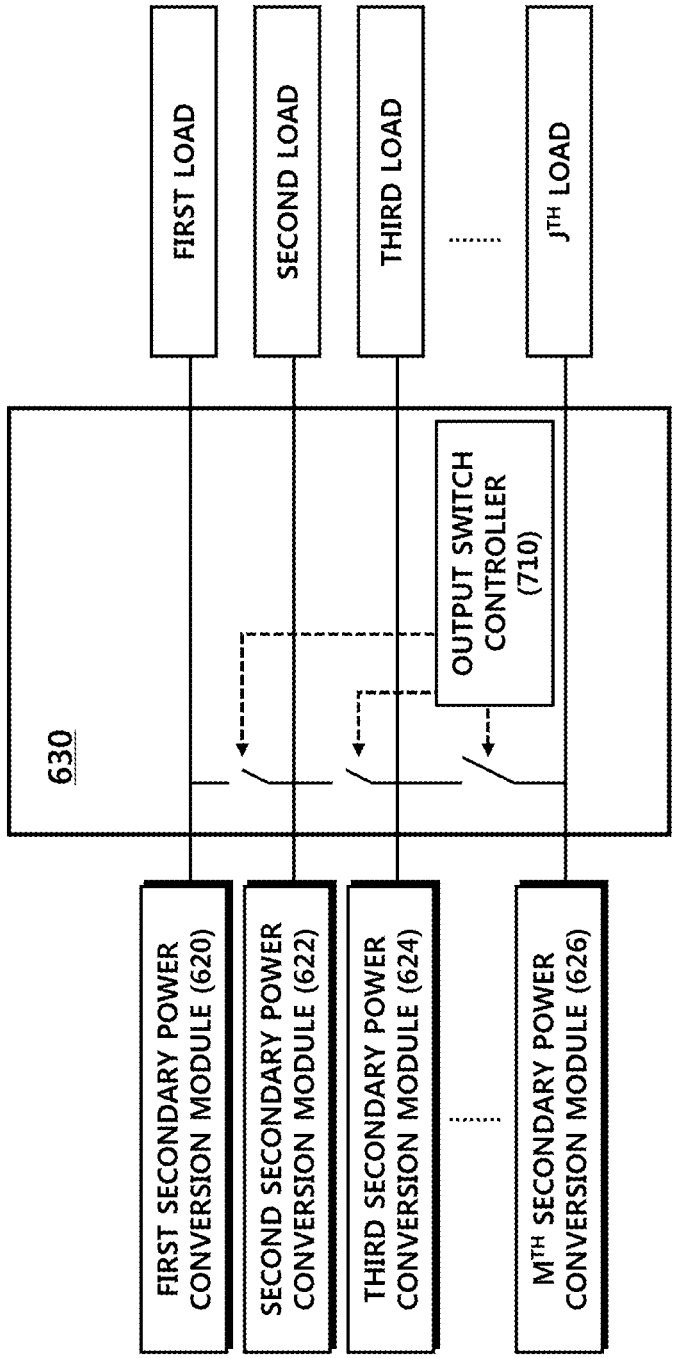
FIG. 7 illustrates an exemplary construction of an output connection unit.

The output connection unit 630 is adapted to connect power, which is delivered from each of the plurality of secondary power conversion modules, to at least one load. FIG. 7 is an exemplary construction diagram regarding the construction of the output connection unit. Referring to FIG. 7, the output connection unit 630 can include controllable switching devices, which can communicate with the secondary power conversion modules or other devices of the power conversion system 100 and change the path of power delivery, as in the case of the input selection unit 110, an output switch controller 710, etc.

The plurality of secondary power conversion modules will be described in more detail. Each secondary power conversion module can include a module control unit, a gating controller, and a power stage. Respective function blocks of the secondary power conversion modules perform the same functions as respective function blocks of the power conversion modules of the power conversion unit 119 described above. Particularly, the power stage of each secondary power conversion module, which includes a plurality of switching devices, corresponds to the power stage 230 of the first power conversion module; the gating controller adapted to perform on/off control regarding the plurality of switching devices corresponds to the gating controller 220 of the first power conversion module; and the module control unit adapted to determine a control scheme regarding the plurality of switching devices according to the type of power supplied to loads and transmit an on/off command signal to the gating controller according to the determined control scheme, thereby controlling the power stage, corresponds to the module control unit 210 of the first power conversion module. The plurality of secondary power conversion modules will be described further with reference to the embodiment of FIG. 8, which is an exemplary circuit diagram regarding the secondary power conversion modules.

Figure 8:
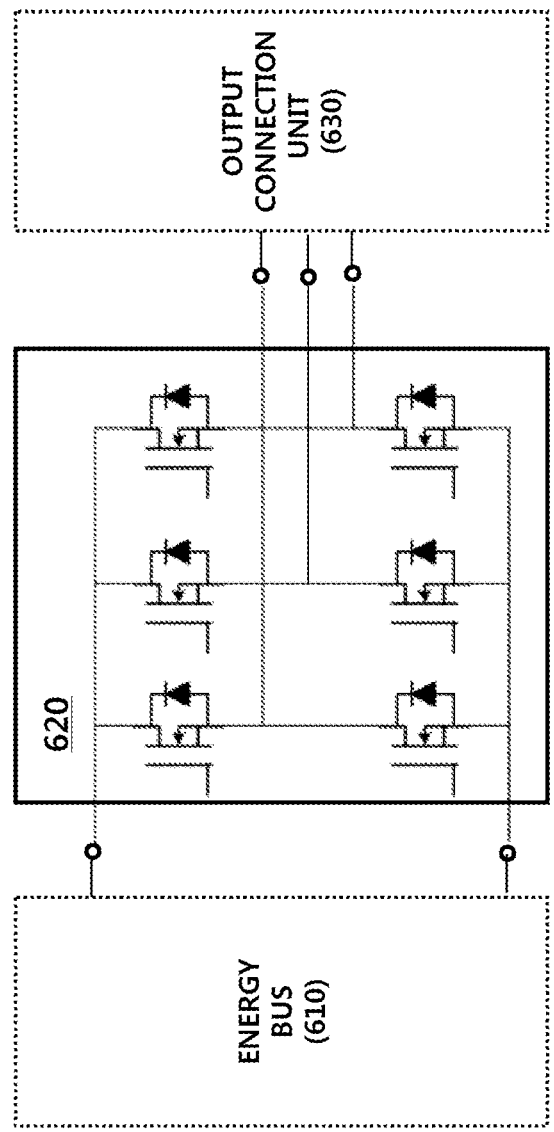
FIG. 8 is an exemplary circuit diagram of a secondary power conversion module.

Referring to FIG. 8, the first secondary power conversion module 620 includes a power stage including six switching devices. Although not shown in FIG. 8, the first secondary power conversion module 620 can include a gating controller adapted to perform on/off control regarding the six switching devices and a module control unit adapted to determine a switching sequence regarding the six switching devices, based on the type of loads, in a power conversion type of DC-DC or DC-AC and transmit an on/off command signal to the gating controller according to the determined switching sequence, thereby controlling the power stage. FIG. 8 illustrates a typical three-phase inverter circuit construction, in which each pair of the six switching devices constitute a leg. In such a three-phase inverter circuit, the switching sequence regarding the switching devices can be adjusted to convert power in one of DC-DC power conversion and DC-AC power conversion types.

The secondary power conversion modules, besides the above-mentioned construction, can always turn on or off some switching devices, as in the case of the plurality of power conversion modules 120, 122, 124, 126, and thus change the topology of the circuit, so that power conversion can be performed according to the type of loads. The secondary power conversion modules, which can convert power according to the type of loads as described above, can implement, together with the plurality of power conversion modules installed at the front stage, a smart function including the ability to deal with a malfunction of the power conversion system 100.

For example, it will be assumed that the first load and the second load are AC-motors, the third load is energy storage system (e.g. batteries of electric car) and the energy bus 610 is DC type energy bus. And, the first secondary power conversion module 620 may deliver power to the first load, the second secondary power conversion module 622 may deliver power to the second load, and the third secondary power conversion module 624 may deliver power to the third load. In such a case, the first secondary power conversion module 620 and the second secondary power conversion module 622 are operated as DC-AC converter, and the third secondary power conversion module 624 is operated as DC-DC converter. After that, when the third secondary power conversion module 624 is broken, the first secondary power conversion module 620 can deliver power supplied from energy bus 610 to the first load and the second load. And the second secondary power conversion module 622 can change power delivery path from the second load to the third load and change operating mode from DC-AC to DC-DC to substitute for the third secondary power conversion module 624.

Although the secondary power conversion modules have been described separately from the power conversion modules belonging to the power conversion unit 119, the secondary power conversion modules can have the same construction as the above-mentioned power conversion modules. The power conversion modules of the power conversion unit 119 have bi-directionality in connection with power conversion, so that input and output can be switched and controlled. For example, a power conversion module controlled for AC-DC power conversion can be used for DC-AC power conversion. For this reason, the power conversion system 100 can have the same construction for both the power conversion modules of the power conversion unit 119 and the secondary power conversion modules.

The secondary power conversion modules can be connected to the output connection unit 630, as described above, to flexibly deal with a malfunction of each secondary power conversion module. Furthermore, the secondary power conversion modules can perform the same functions as the power conversion modules of the power conversion unit 119 described above, and the self-healing function, which has been described as characteristic to the power conversion modules of the power conversion unit 119, also applies to the secondary power conversion modules. The relevant operating principle has been described with reference to FIG. 5, and repeated description thereof will be omitted herein. However, in order to aid understanding, a sequence when one of the secondary power conversion modules malfunctions will be now described. When the first secondary power conversion module 620 malfunctions among the plurality of secondary power conversion modules, the output connection unit 630 changes the connection of the first load from the first secondary power conversion module 620 to the second secondary power conversion module 622, which is connected to no load, among the plurality of secondary power conversion modules. When the second secondary power conversion module 622 is connected to the second load, the second secondary power conversion module 622 is disconnected and then connected to the first load, which is connected to the first secondary power conversion module 620. The module control unit of the second secondary power conversion module 622 can change the control scheme of the second secondary power conversion module 622 according to the type of power supplied to the first load.

Figure 9:
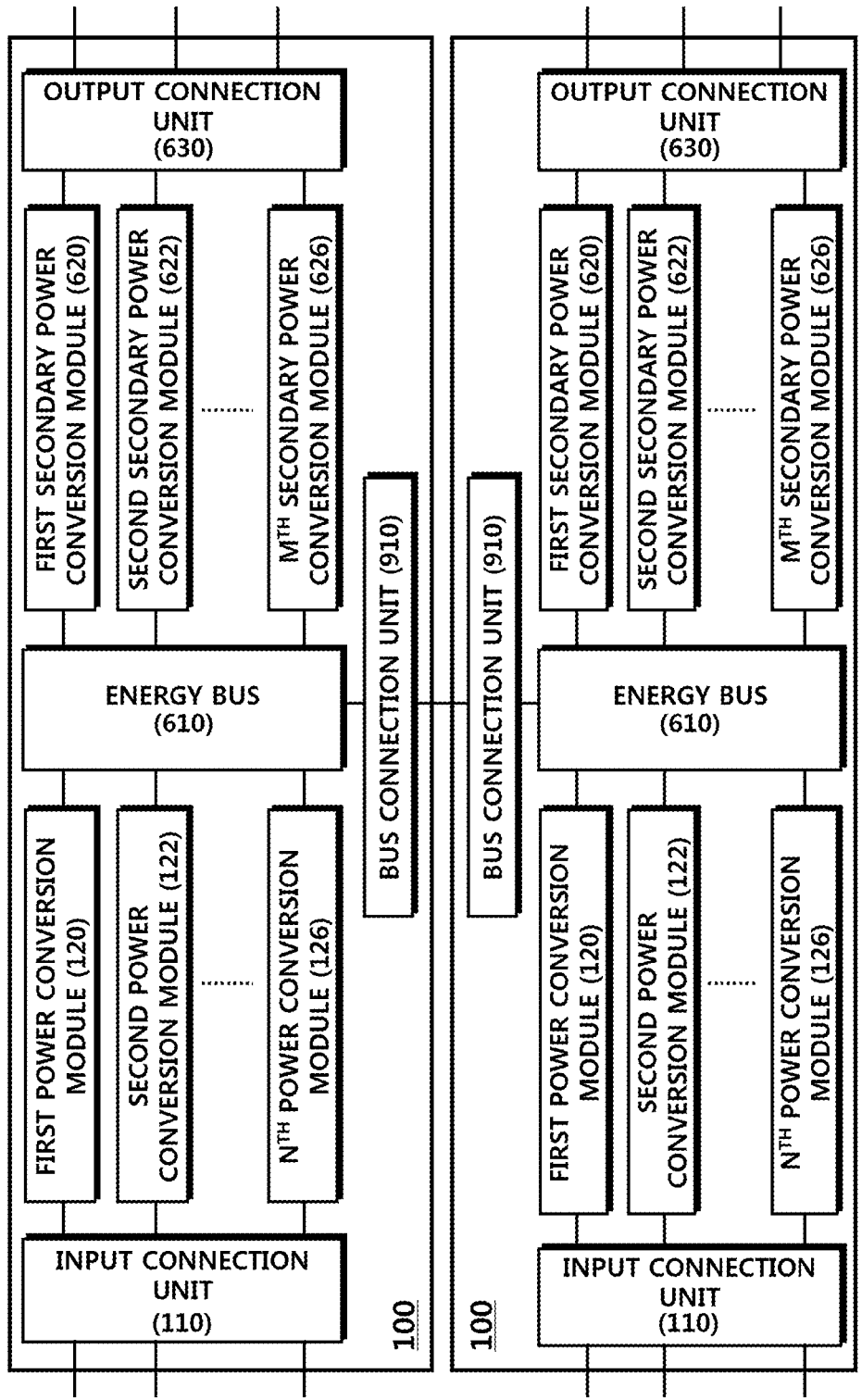
FIG. 9 is an exemplary connection diagram illustrating connection of energy buses of two power conversion systems.

FIG. 9 is an exemplary connection diagram illustrating connection of energy buses of two power conversion systems. Referring to FIG. 9, each power conversion system 100 can further include a bus connection unit 910 connected to the energy bus 610 and adapted to interconnect the energy bus 610 of its power conversion system 100 to an energy bus of the other power conversion system. When the energy bus 610 is a DC bus, and when the energy bus of the other power conversion system is also a DC bus (i.e. when both energy buses have the same voltage), the bus connection units 910 can simply be terminals or cables. However, when the voltages are different, a conversion process may be needed to connect the buses. Connection of the energy buses of the two power conversion systems through the bus connection units 910 enables power processing of a larger capacity and provides an environment guaranteeing stable operation even if a specific part malfunctions.

A power conversion system 100 according to an embodiment of the present invention has been described above; a power conversion method by the power conversion system 100 according to an embodiment of the present invention will now be described. The power conversion method according to an embodiment of the present invention, described below, can be entirely executed by the power conversion system 100 according to an embodiment of the present invention illustrated in FIG. 1.

Figure 10:
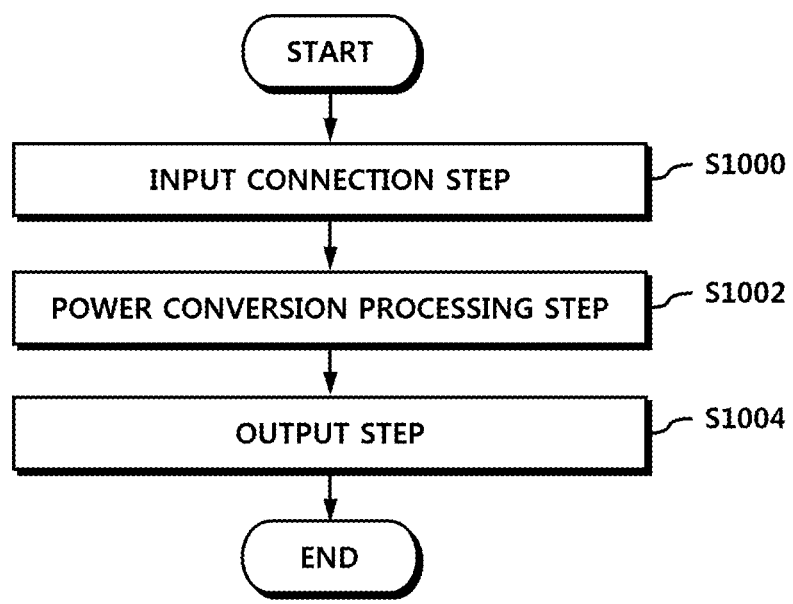
FIG. 10 is a flowchart of a power conversion method according to an embodiment of the present invention.

FIG. 10 is a flowchart of a power conversion method according to an embodiment of the present invention.

Referring to FIG. 10, the power conversion system 100 selectively connects power, which is supplied from each of the plurality of power supply sources, to at least one of the plurality of power conversion modules (S1000, input connection step). Next, the power conversion system 100 determines a control scheme regarding the switching devices according to power, which is supplied from the power supply source connected through the input connection step, with regard to each of the plurality of power conversion modules and performs on/off control regarding the switching devices according to the determined control scheme, thereby converting the supplied power (S1002). Finally, the converted power is delivered to the loads (S1004).

Although a power conversion method according to an embodiment of the present invention has been described according to the procedure shown in FIG. 10, it is only intended for convenience of descriptions, and, without departing from the essential concept of the present invention, the procedure of performing respective steps can be modified according to the implementation scheme, at least two steps can be integrated, or one step can be divided into at least two steps and executed.

A power conversion system 100 and a power conversion method by the power conversion system 100 according to an embodiment of the present invention have been described above. An apparatus for controlling a power conversion system according to another embodiment of the present invention will now be described.

Figure 11:
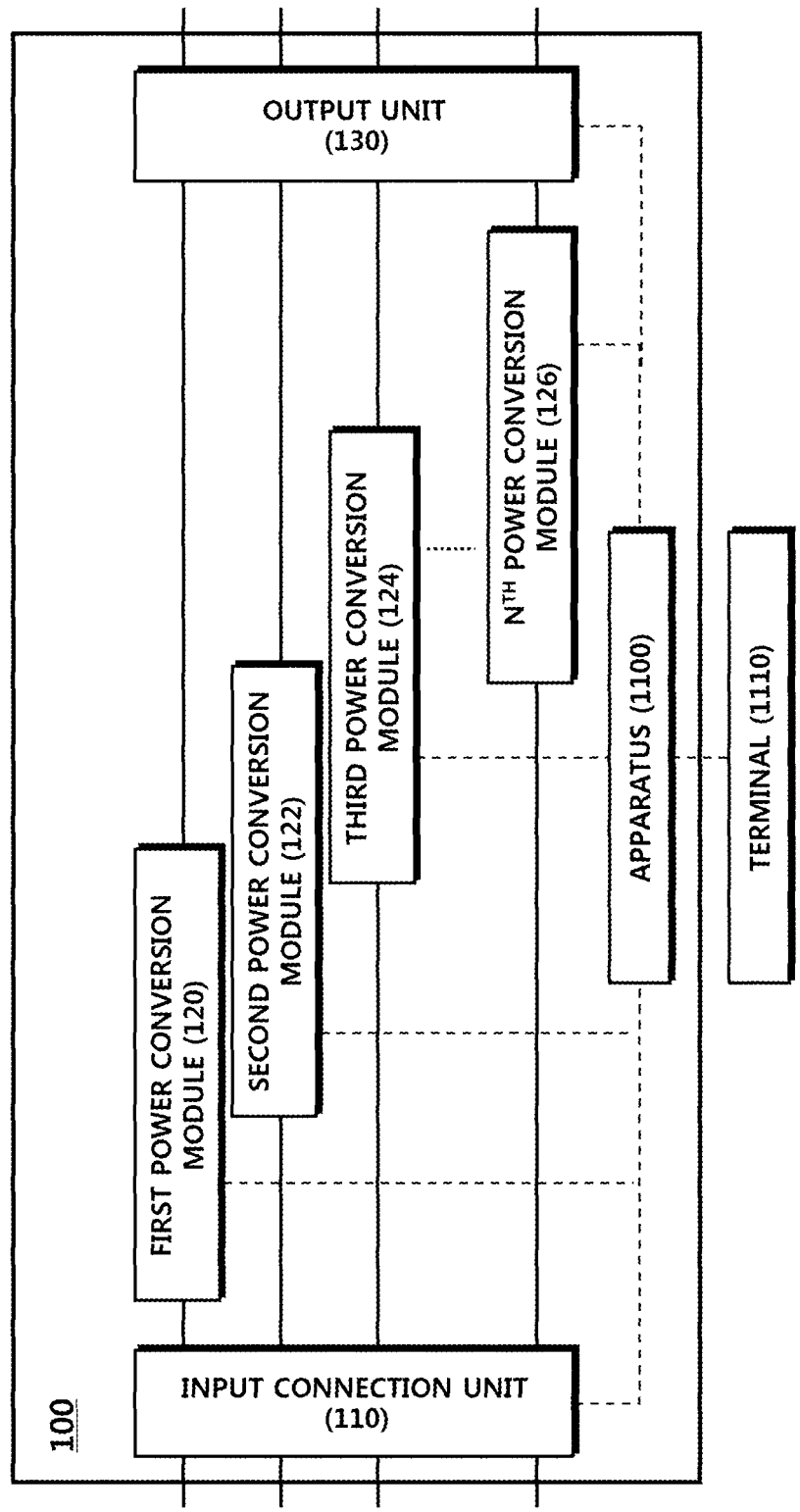
FIG. 11 is a signal connection diagram illustrating interconnection between an apparatus for controlling a power conversion system according to another embodiment of the present invention and a power system.

FIG. 11 is a signal connection diagram illustrating interconnection between an apparatus for controlling a power conversion system according to another embodiment of the present invention and a power system. Descriptions of the input connection unit 110, the first power conversion module 120, the second power conversion module 122, the third power conversion module 124, the n$^{th}$ power conversion module 126, and the output unit 130 illustrated in FIG. 11 are the same as in the case of the power conversion system 100 according to an embodiment of the present invention, and repeated descriptions thereof will be omitted herein.

Referring to FIG. 11, the apparatus 1100 is connected to all blocks which constitute the power conversion system 100 and which are capable of exchanging information via the network. The apparatus 1100 can be substantially understood as a highest-level control apparatus that monitors the power conversion system 100 at the center and controls it. The apparatus 1100 can be connected to a terminal 1110 so that the user can check out information created by the apparatus or transmit a control command to the apparatus 1100 through the terminal 1110.

Figure 12:
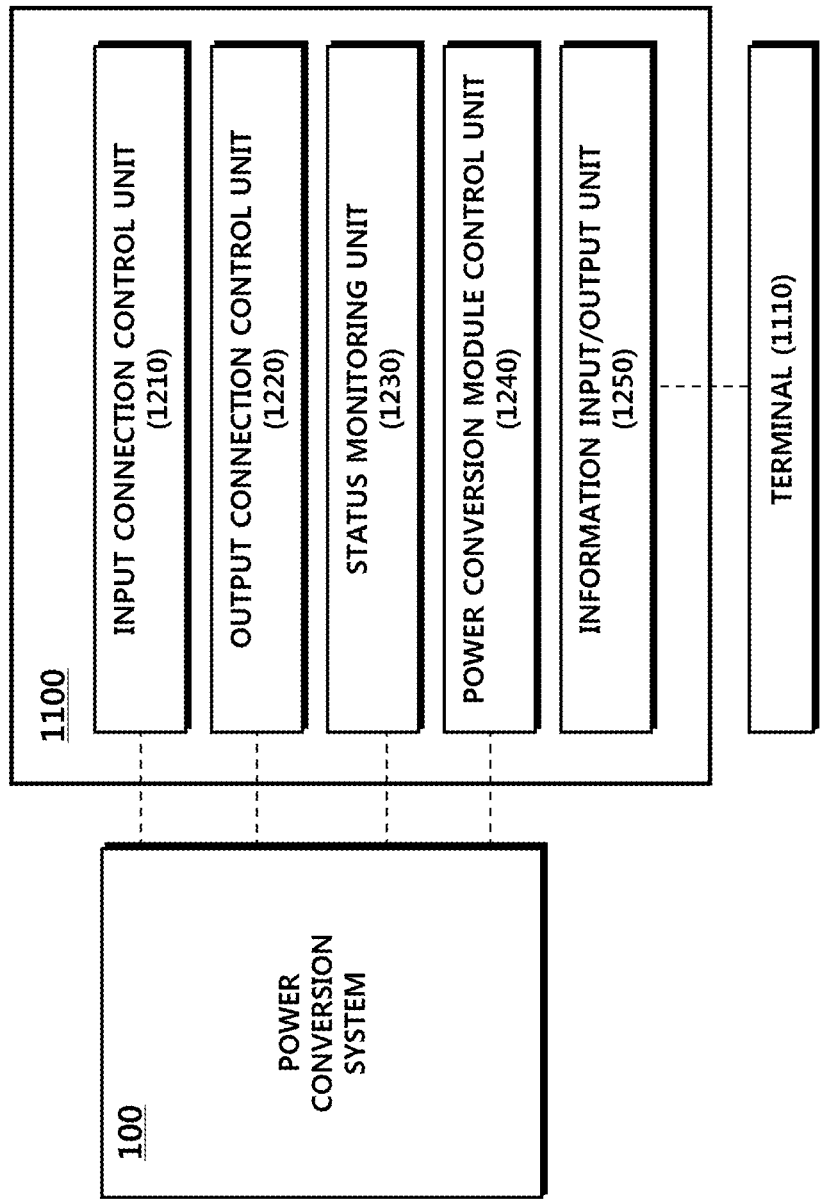
FIG. 12 is an internal block diagram of an apparatus for controlling a power conversion system according to another embodiment of the present invention.

FIG. 12 is an internal block diagram of the apparatus for controlling a power conversion system according to another embodiment of the present invention.

Referring to FIG. 12, the apparatus 1100 can include an input connection control unit 1210, an output connection control unit 1220, a status monitoring unit 1230, a power conversion module control unit 1240, and an information input/output unit 1250.

The status monitoring unit 1230 is adapted to acquire information regarding a malfunction of each of the plurality of power conversion modules constituting the power conversion system 100. The status monitoring unit 1230 can have a sensor installed at each of the plurality of power conversion modules to acquire malfunction information; or receive malfunction information, which has been obtained by each power conversion module itself, through the network. Alternatively, the status monitoring unit 1230 can acquire malfunction information regarding a specific power conversion module based on malfunction information inputted through the terminal 1110 by the administrator of the power conversion system 100.

When it is confirmed based on the acquired malfunction information that, among the plurality of power conversion modules of the power conversion system 100, the first power conversion module 120 is malfunctioning, the input connection control unit 1210 controls the input control unit 110 of the power conversion system 100 installed between the plurality of power supply sources and the plurality of power conversion modules so that power supplied from the first power supply source, which is connected to the first power conversion module 120, is delivered to the second power conversion module 122. For example, the input switch controller 410 of the input connection unit 110 can be controlled to change the path from the malfunctioning first power conversion module 120 to the second power conversion module 122.

The power conversion module control unit 1240 is adapted to determine the type of power supplied from the first power supply source, when power supplied from the first power supply source is delivered to the second power conversion module through the input connection control unit 1210, and control determination of the control scheme regarding the switching devices of the second power conversion module 122 according to the determined type of power.

The power conversion module control unit 1240 can also determine the type of power supplied from the first power supply source according to information regarding the type of power supplied from the power supply source, which is inputted from the terminal 1110. In addition, the power conversion module control unit 1240 can also directly communicate with the first power supply source, acquire information regarding the first power supply source, and determine the type of supplied power based on the acquired information. It is also possible to determine the type by sensing the voltage type, for example, of the supplied power.

An apparatus 1100 according to another embodiment of the present invention has been described above. A method of controlling a power conversion system 100 by the apparatus 1100 according to another embodiment of the present invention will now be described. The method of controlling a power conversion system 100 according to another embodiment of the present invention, which will now be described, can be fully executed by the apparatus 1100 according to another embodiment of the present invention illustrated in FIG. 12.

Figure 13:
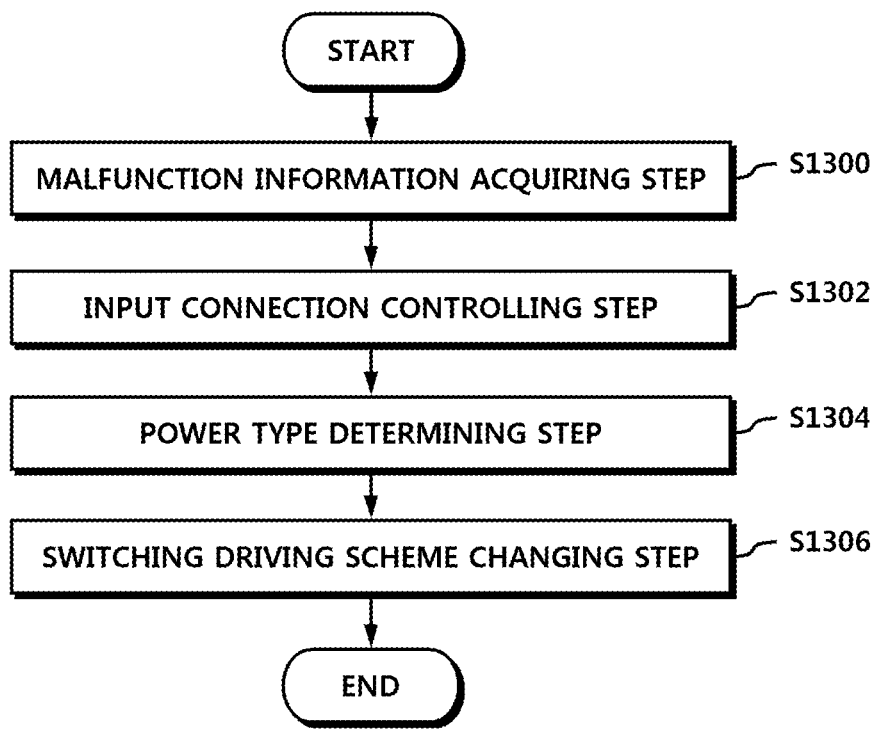
FIG. 13 is a flowchart of a method for controlling a power conversion system according to another embodiment of the present invention.

FIG. 13 is a flowchart of a method of controlling a power conversion system according to another embodiment of the present invention.

Referring to FIG. 13, the apparatus 1100 acquires malfunction information regarding each of the plurality of power conversion modules of the power conversion system 100 (S1300). When it is determined based on the acquired malfunction information that, among the plurality of power conversion modules of the power conversion system 100, the first power conversion module 120 is malfunctioning, the apparatus 1100 controls the input connection unit 110 of the power conversion system 100 installed between the plurality of power supply sources and the plurality of power conversion modules so that power supplied from the first power supply source, which is connected to the first power conversion module 120, is delivered to the second power conversion module 122 (S1302, input connection control step). The apparatus 1100 determines the type of power supplied from the first power supply source (S1304). When power supplied from the first power supply source is delivered to the second power conversion module 122 through the input connection control step, the apparatus 1100 controls change of the control scheme regarding the switching devices of the second power conversion module 122 according to the determined type of power supplied from the first power supply source (S1306).

Although a method of controlling a power conversion system 100 according to another embodiment of the present invention has been described according to the procedure shown in FIG. 13, it is only intended for convenience of descriptions, and, without departing from the essential concept of the present invention, the procedure of performing respective steps can be modified according to the implementation scheme, at least two steps can be integrated, or one step can be divided into at least two steps and executed.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although an exemplary embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A power conversion system for converting power supplied from a plurality of power supply sources and supplying loads with the power, the system comprising:
   a power conversion unit comprising a plurality of power conversion modules adapted to perform power conversion according to a type of power supplied from the plurality of power supply sources;
   an input connection unit adapted to selectively connect power supplied from each of the plurality of power supply sources to at least one of the plurality of power conversion modules;
   an output unit adapted to deliver power converted by the power conversion unit to the loads;
   a power stage comprising a plurality of switching devices;
   a gating controller adapted to perform on/off control regarding the plurality of switching devices; and
   a module control unit adapted to control the power stage by determining a control scheme regarding the plurality of switching devices according to a type of supplied power and transmitting an on/off command signal to the gating controller according to the determined control scheme; and
   wherein the module control unit is adapted to control the power stage by determining a switching device always turned on or off, among the plurality of switching devices, according to a type of supplied power, determining topology of a circuit included in the power stage, and transmitting an on/off command signal to the gating controller according to the determined circuit topology.

2. The power conversion system as claimed in claim 1, wherein, when a first power conversion module among the plurality of power conversion modules malfunctions, the input connection unit changes connection of a first power supply source from the first power conversion module to a second power conversion module, which is not connected to any of the plurality of power supply sources, among the plurality of power conversion modules.

3. The power conversion system as claimed in claim 1, wherein, when a first power conversion module among the plurality of power conversion modules malfunctions, the input connection unit disconnects a second power supply source from a second power conversion module among the plurality of power conversion modules and connects the second power conversion module to a first power supply source connected to the first power conversion module, and the module control unit of the second power conversion module changes a control scheme of the second power conversion module according to a type of power supplied from the first power supply source.

4. The power conversion system as claimed in claim 1, wherein the output unit comprises an energy bus connected to the plurality of power conversion modules and adapted to deliver power processed by the plurality of power conversion modules to the loads.

5. The power conversion system as claimed in claim 4, further comprising a bus connection unit adapted to connect the energy bus of the power conversion system to an energy bus of a different power conversion system.

6. The power conversion system as claimed in claim 4, wherein the energy bus is a DC bus, the power stage of each power conversion module comprises a plurality of switching devices, and the module control unit of each power conversion module is adapted to control the power stage according to a control scheme selected from the group consisting of AC-DC power conversion, DC-DC power conversion, and AC rectification according to a type of supplied power.

7. The power conversion system as claimed in claim 4, wherein the output unit comprises a plurality of secondary power conversion modules adapted to secondarily convert power delivered through the energy bus and an output connection unit adapted to connect power delivered from each of the plurality of secondary power conversion modules to at least one load.

8. The power conversion system as claimed in claim 7, wherein, when a first secondary power conversion module among the plurality of secondary power conversion modules malfunctions, the output connection unit changes connection of a first load from the first secondary power conversion module to a second secondary power conversion module, which is not connected to the at least one load, among the plurality of secondary power conversion modules.

9. The power conversion system as claimed in claim 7, wherein each secondary power conversion module comprises:
   a power stage comprising a plurality of switching devices;
   a gating controller adapted to perform on/off control regarding the plurality of switching devices; and
   a module control unit adapted to control the power stage by determining a switching sequence regarding the plurality of switching devices in a power conversion type of DC-DC or DC-AC according to a type of a load connected to the secondary power conversion module and transmitting an on/off command signal to the gating controller according to the determined switching sequence.

10. The power conversion system as claimed in claim 9, wherein, when a first secondary power conversion module among the plurality of secondary power conversion modules malfunctions, the output connection unit disconnects a second load from a second secondary power conversion module among the plurality of secondary power conversion modules and connects the second secondary power conversion module to a first load connected to the first secondary power conversion module, and the module control unit of the second secondary power conversion module changes a control scheme of the second secondary power conversion module according to a type of power supplied to the first load.

11. The power conversion system as claimed in claim 1, wherein the input connection unit is adapted to selectively connect power supplied from each of the plurality of power supply sources to at least one of the plurality of power conversion modules through a controllable switching device.

12. A power conversion method by a power conversion system adapted to convert power supplied from a plurality of power supply sources through a plurality of switching-type power conversion modules and supply loads with the converted power, the method comprising the steps of:
   performing input connection by selectively connecting power supplied from each of the plurality of power supply sources to at least one of the plurality of power conversion modules;
   converting the supplied power by determining a control scheme regarding switching devices, according to power supplied from a power supply source connected in the step of performing input connection, with regard to each of the plurality of power conversion modules and performing on/off control regarding the switching devices according to the determined control scheme;
   delivering the converted power to the loads;
   a power stage comprising a plurality of switching devices;
   a gating controller performing on/off control regarding the plurality of switching devices; and
   a module control unit control the power stage by determining a control scheme regarding the plurality of switching devices according to a type of supplied power and transmitting an on/off command signal to the gating controller according to the determined control scheme; and
   wherein the module control unit controls the power stage by determining a switching device always turned on or off, among the plurality of switching devices, according to a type of supplied power, determining topology of a circuit included in the power stage, and transmitting an on/off command signal to the gating controller according to the determined circuit topology.

13. An apparatus for controlling a power conversion system adapted to convert power supplied from a plurality of power supply sources through a plurality of switching-type power conversion modules and supply loads with the converted power, the apparatus comprising:
   a status monitoring unit adapted to acquire malfunction information regarding each of the plurality of power conversion modules;
   an input connection control unit adapted to control an input connection unit of the power conversion system installed between the plurality of power supply sources and the plurality of power conversion modules so that, when it is determined based on the malfunction information that a first power conversion module among the plurality of power conversion modules malfunctions, power supplied from a first power supply source connected to the first power conversion module is delivered to a second power conversion module;
   a power conversion module control unit adapted to determine a type of power supplied from the first power supply source, when power supplied from the first power supply source is delivered to the second power conversion module through the input connection control unit, and control determination of a control scheme regarding switching devices of the second power conversion module according to the determined type;
   a power stage comprising a plurality of switchin devices;
   a gating controller adapted to perform on/off control regarding the plurality of switching devices; and
   a module control unit adapted to control the power stage by determining a control scheme regarding the plurality of switching devices according to a type of supplied power and transmitting an on/off command signal to the gating controller according to the determined control scheme; and
   wherein the module control unit is adapted to control the power stage by determining a switching device always turned on or off, among the pluratiy of switching devices according to a type of supplied power determining topology of a circuit included in the power stage, and transmitting an on/off command signal to the gating controller according to the determined circuit topology.

14. The apparatus as claimed in claim 13, wherein the power conversion module control unit is adapted to determine a type of power supplied from the first power supply source according to power supply source supply power type information inputted from a terminal.

* * * * *